US012747322B2

(12) United States Patent
Olsen et al.

(10) Patent No.: US 12,747,322 B2
(45) Date of Patent: Sep. 29, 2026

(54) GREEN SYNTHESIS OF AMINO ACID BASED POLY(ESTER UREA)S

(71) Applicant: Massachusetts Institute of Technology, Cambridge, MA (US)

(72) Inventors: Bradley David Olsen, Arlington, MA (US); Katharina Fransen, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 407 days.

(21) Appl. No.: 18/515,948

(22) Filed: Nov. 21, 2023

(65) Prior Publication Data

US 2024/0182642 A1 Jun. 6, 2024

Related U.S. Application Data

(60) Provisional application No. 63/427,755, filed on Nov. 23, 2022.

(51) Int. Cl.
*C08G 71/02* (2006.01)
*C08G 71/04* (2006.01)

(52) U.S. Cl.
CPC ............. *C08G 71/02* (2013.01); *C08G 71/04* (2013.01); *C08G 2230/00* (2013.01)

(58) Field of Classification Search
CPC ..... C08G 71/02; C08G 2230/00; C08G 71/04
See application file for complete search history.

(56) References Cited

FOREIGN PATENT DOCUMENTS

WO WO-2019104163 A1 * 5/2019 ............. B29D 28/00

* cited by examiner

*Primary Examiner* — Rabon A Sergent
(74) *Attorney, Agent, or Firm* — Foley Hoag LLP; Dana M. Gordon; Alexander J. Chatterley

(57) ABSTRACT

Disclosed herein are methods of synthesizing poly(ester urea)s, such as via the method exemplified by the scheme set forth below:

Monomer Synthesis Scheme

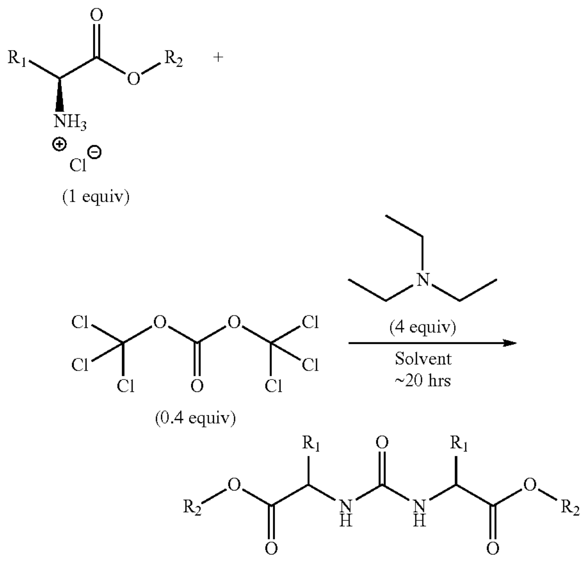

>95% Conversion

Polymer Synthesis Scheme

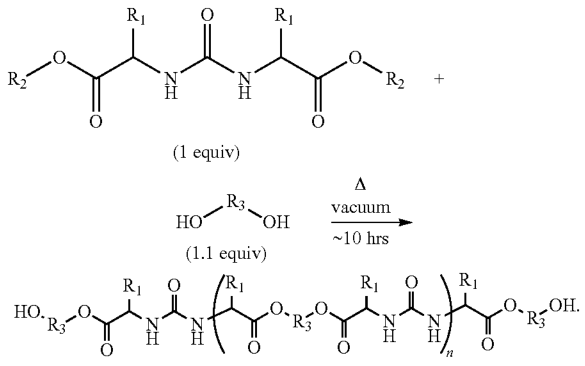

24 Claims, 4 Drawing Sheets

GREEN SYNTHESIS OF AMINO ACID BASED POLY(ESTER UREA)S

RELATED APPLICATIONS

This application claims the benefit of priority to U.S. Provisional Patent Application 63/427,755, filed Nov. 23, 2022.

BACKGROUND

Amino acid based poly(ester urea)s (PEUs) have been implemented for use in a variety of biomedical applications such as soft tissue repair, bone defect treatment, and vascular tissue engineering. Additionally, these materials are biomass-based, biodegradable, and have tunable mechanical and physical properties, making them ideal candidates for further study and implementation in commodity polymer products. However, the synthesis of these materials is currently time consuming, carbon inefficient, and utilizes toxic reagents that are not regenerable or sustainably sourced.

SUMMARY

In order to generate materials that are sustainable, utilize green synthetic procedures, and have the potential for scalable industrial implementation, a new synthetic scheme has been developed, and its effectiveness has been demonstrated across a variety of amino acids.

In one aspect, the present disclosure provides methods of synthesizing a poly(ester urea) (PEU), comprising:

a. providing an amino acid alkyl ester or amino acid alkyl ester hydrochloride;
b. reacting the amino acid with triphosgene in the presence of an amine base to produce an amino acid ester urea; and
c. reacting the amino acid ester urea with a diol to produce the PEU.

DETAILED DESCRIPTION

Figure 1:
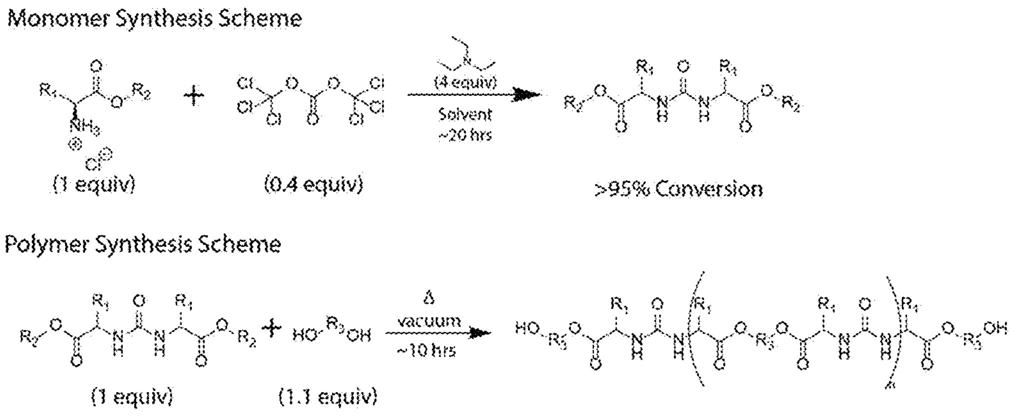
FIG. 1 shows monomer and polymer synthesis schemes. Triethylamine is depicted as the amine base used for hydrochloric acid capture. The polymer synthesis scheme states that there is 0.1 equivalent stoichiometric excess of diol; however, this amount is tuned depending on the specific reagents used during the reaction.

The developed monomer synthesis reacts the amine of the amino acid first, with the carboxylic acid protected as an ester. The resulting amino acid ester urea is then purified and reacted with a diol under melt synthesis conditions to generate a polymer. The monomer synthesis has been shown to be effective with both an amino acid ester and amino acid ester hydrochloride salt. For the amino acid ester, an amine base is used to capture hydrochloric acid evolved from triphosgene used during the reaction. For the amino acid ester hydrochloride salt, the amine base is used to capture both the hydrochloric acid from the amino acid ester salt and the hydrochloric acid evolved from triphosgene during the reaction. The synthetic scheme developed is shown in FIG. 1.

Figure 2:
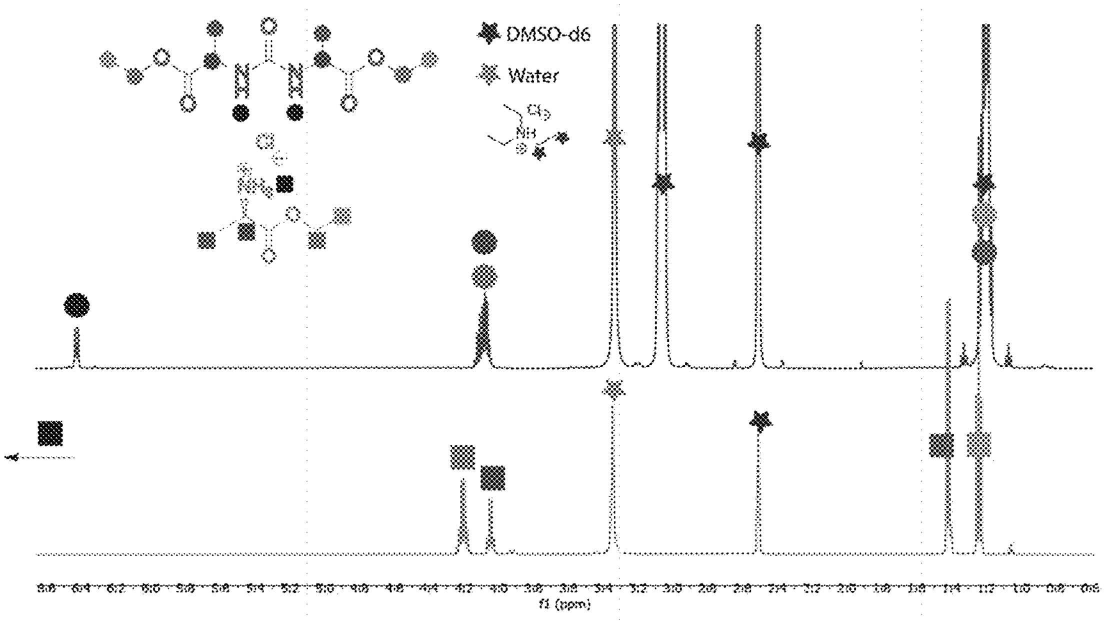
FIG. 2 shows $^{1}H$ NMR analysis of alanine ethyl ester hydrochloride and resulting alanine ethyl ester urea. Solvent used for analysis was DMSO-d6. The crude reaction product of alanine ethyl ester urea is presented, resulting in the presence of triethylammonium hydrochloride in the $^{1}H$ NMR spectra.
Figure 3:
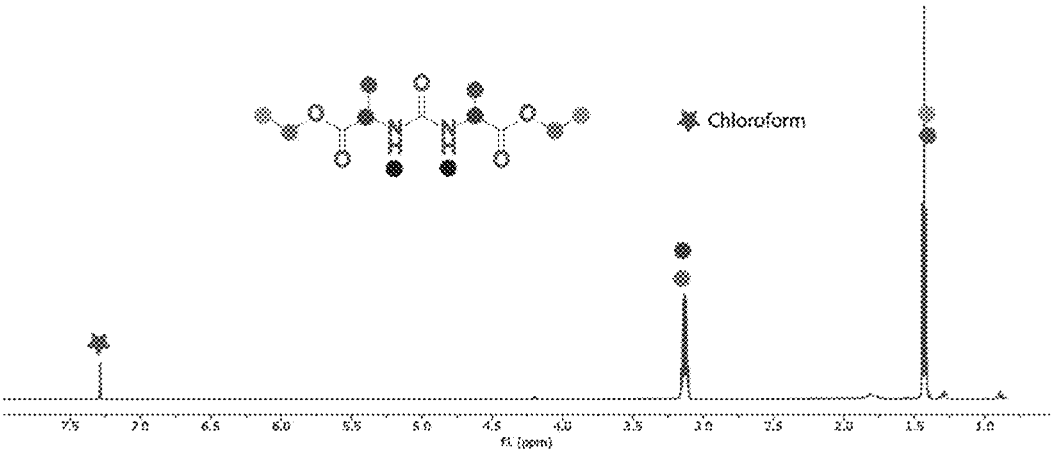
FIG. 3 shows $^{1}H$ NMR analysis of the product yielding from reacting alanine ethyl ester with triphosgene in the presence of triethylamine.

The monomer synthesis has been demonstrated to yield greater than 95% conversion (as determined by $^{1}H$ NMR) across a variety of amino acids. Alanine ethyl ester and alanine ethyl ester hydrochloride have each been used to depict the feasibility of the reaction both with and without the hydrochloride salt. FIG. 2 depicts the hydrochloride salt of alanine ethyl ester, as well as the resulting alanine ethyl ester urea upon reaction of the monomer with triphosgene in the presence of triethylamine. The resulting reaction product of alanine ethyl ester reacting with triphosgene in the presence of triethylamine is depicted in FIG. 3. It should be noted that the solvent used for $^{1}H$ NMR analysis in FIG. 3 was deuterated chloroform, resulting in the differences in chemical shifts between the two products.

Figure 4:
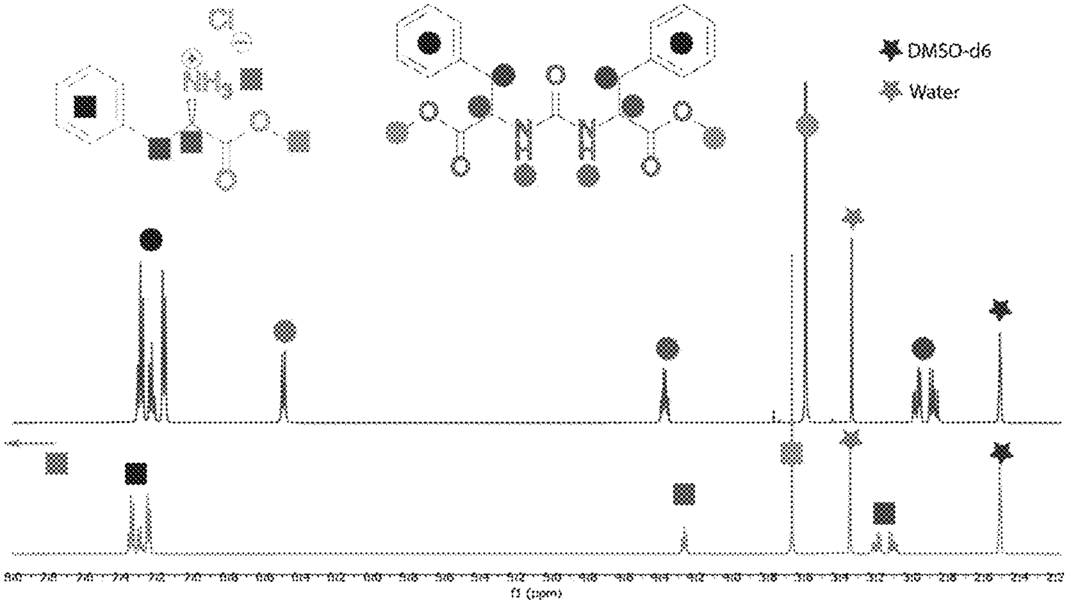
FIG. 4 shows $^{1}H$ NMR analysis of purified phenylalanine methyl ester urea and phenylalanine methyl ester hydrochloride in DMSO-d6.
Figure 5:
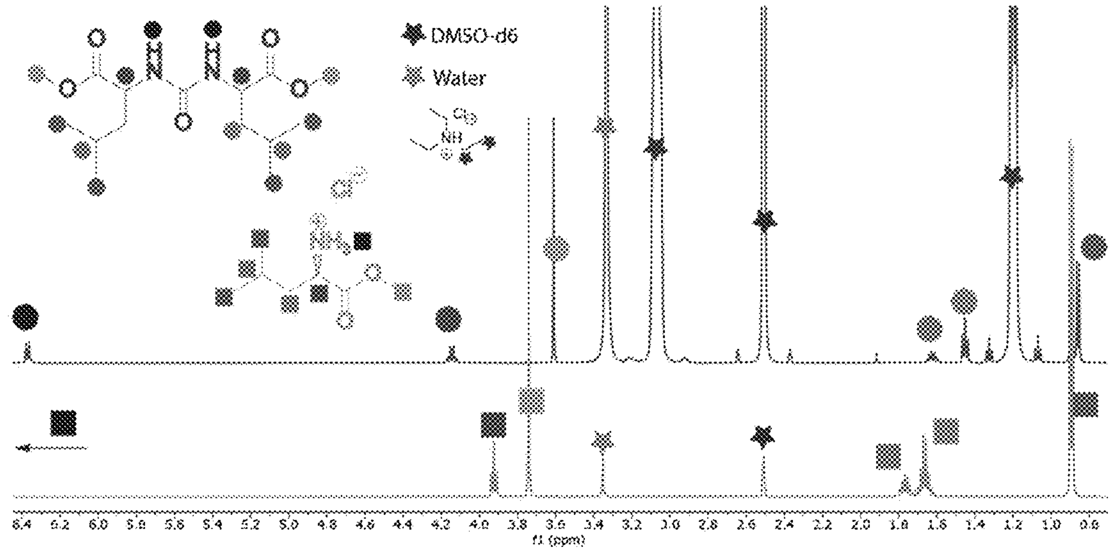
FIG. 5 shows $^{1}H$ NMR analysis of crude leucine methyl ester urea and leucine methyl ester hydrochloride in DMSO-d6 in the presence of triethylammonium hydrochloride.
Figure 6:
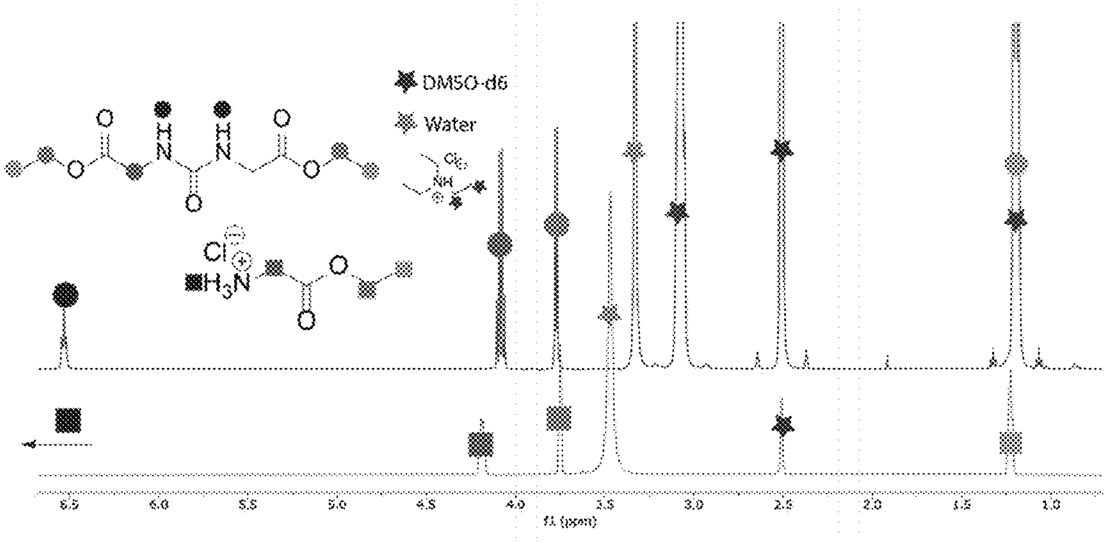
FIG. 6 shows $^{1}H$ NMR analysis of crude glycine ethyl ester urea and glycine ethyl ester hydrochloride in DMSO-d6 in the presence of triethylammonium hydrochloride.

The successful synthesis of phenylalanine methyl ester urea, leucine methyl ester urea, and glycine ethyl ester urea from amino acid ester hydrochlorides was demonstrated. The reaction products as well as starting amino acid ester are depicted in FIGS. 4-6. Phenylalanine methyl ester urea was purified before $^{1}H$ NMR analysis, while leucine methyl ester urea and glycine ethyl ester urea were analyzed as crude products with remaining triethylammonium hydrochloride.

Figure 7:
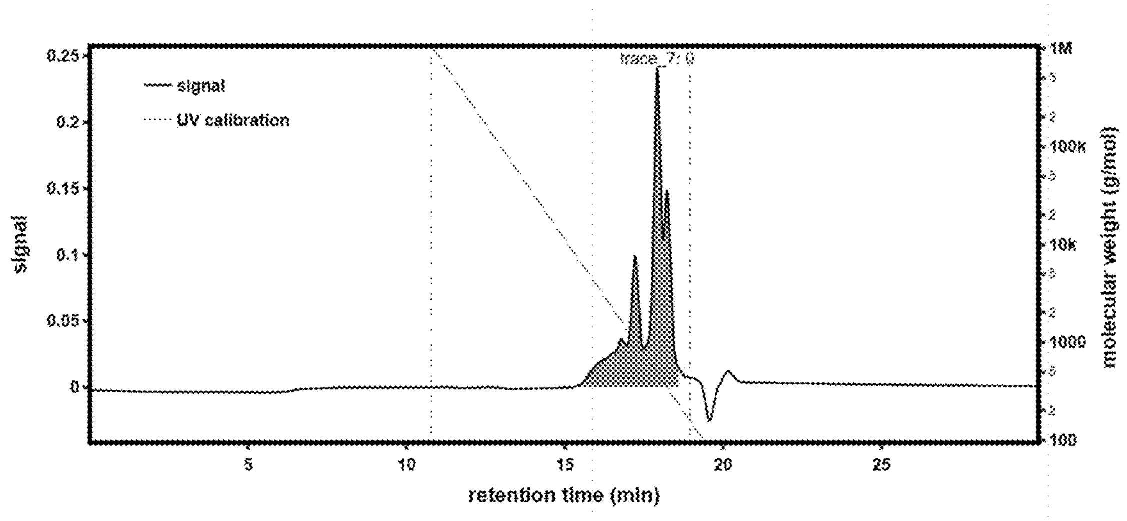
FIG. 7 shows a GPC trace of the product between phenylalanine methyl ester urea and 1,6-hexanediol as a proof of concept for the polymerization scheme.

Reaction of the purified phenylalanine methyl ester urea with hexanediol was performed as a proof-of-concept for the ability of the monomers to reaction under melt conditions. The reaction yielded a distribution of molecular weights with a $M_n$ of 560 and $M_w$ of 940 Da. The resulting GPC of the reaction product in tetrahydrofuran is shown in FIG. 7.

In summary, a novel synthesis yielding amino acid ester ureas has been established, and a proof of concept for synthesis of polymers from these monomers, when purified, with diols under melt conditions has been carried out. These synthetic procedures provide a green chemistry alternative to poly(ester urea)s with feasible scalability across a variety of amino acids.

In one aspect, the present disclosure provides methods of synthesizing a poly(ester urea) (PEU), comprising:

a. providing an amino acid alkyl ester or amino acid alkyl ester hydrochloride;
b. reacting the amino acid with triphosgene in the presence of an amine base to produce an amino acid ester urea; and
c. reacting the amino acid ester urea with a diol to produce the PEU.

In certain embodiments, the amino acid alkyl ester or amino acid alkyl ester hydrochloride is an amino acid alkyl ester or amino acid alkyl ester hydrochloride of a naturally occurring amino acid.

In certain embodiments, the method comprises providing an amino acid alkyl ester. In certain embodiments, the method comprises providing an amino acid alkyl ester hydrochloride. In certain embodiments, the alkyl ester or alkyl ester hydrochloride is a methyl ester, ethyl ester, or propyl ester.

In certain embodiments, reacting the amino acid ester urea with the diol comprises heating the amino acid ester urea and the diol. In certain embodiments, reacting the amino acid ester urea with the diol comprises heating the amino acid ester urea and the diol under reduced pressure.

In certain embodiments, the method is performed from 8-24 hours. In certain embodiments, the method is performed for about 8 hours, about 10 hours, about 12 hours, about 14 hours, about 16 hours, about 18 hours, about 20 hours, or about 24 hours.

In certain embodiments, the amine base is triethylamine or triethylammonium hydrochloride. In certain embodiments, the amine base is triethylamine. In certain embodiments, the amine base is triethylammonium hydrochloride.

In certain embodiments, the diol is an alkyl diol, an alkenyl diol, or an alkynyl diol. In certain embodiments, the diol is an alkyl diol. In certain embodiments, the diol is 1,6-hexanediol.

In certain embodiments, the amino acid ester urea is selected from the group consisting of phenylalanine methyl ester urea, leucine methyl ester urea, and glycine ethyl ester urea.

In certain embodiments, the method converts the amino acid to the PEU at a yield of greater than 90%. In certain embodiments, the method converts the amino acid to the PEU at a yield of greater than 95%. In certain embodiments, the method converts the amino acid to the PEU at a yield of greater than 99%.

In certain embodiments, the stereochemistry of the amino acid alkyl ester or amino acid alkyl ester hydrochloride is retained in the PEU.

In certain embodiments, the PEU has an average molecular weight of 500 to 1,500 Daltons. In certain embodiments, the PEU has an average molecular weight of 500 to 1,000 Daltons. In certain embodiments, the PEU has an average molecular weight of about 500, about 600, about 700, about 800, about 900, about 1,000, about 1,100, about 1,200, about 1,300, about 1,400, or about 1,500 Daltons.

In certain embodiments, the PEU comprises, on average, 200-800 repeat units. In certain embodiments, the PEU comprises, on average, about 200, about 300, about 400, about 500, about 600, about 700, or about 800 repeat units.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, $4^{th}$ ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, $6^{th}$ ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six H radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four H radicals in a given structure with the substituents mentioned above. More preferably, one to three H radicals are replaced by the substituents as mentioned above. It is understood that the substituent can be further substituted.

As used herein, the term "alkyl" refers to saturated aliphatic groups, including but not limited to $C_1$-$C_{10}$ straight-chain alkyl groups or $C_1$-$C_{10}$ branched-chain alkyl groups. Preferably, the "alkyl" group refers to $C_1$-$C_6$ straight-chain alkyl groups or $C_1$-$C_6$ branched-chain alkyl groups. Most preferably, the "alkyl" group refers to $C_1$-$C_4$ straight-chain alkyl groups or $C_1$-$C_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_{1-30}$ for straight chains, $C_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a H on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. Coalkyl indicates a H where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS-.

The term "amido", as used herein, refers to a group

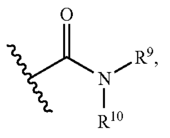

wherein $R^9$ and $R^{10}$ each independently represent a H or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

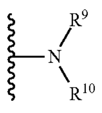

or

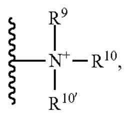

wherein $R^9$, $R^{10}$, and $R^{10}$, each independently represent a H or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

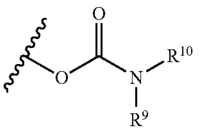

or

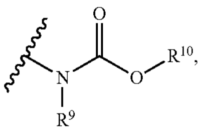

wherein $R^9$ and $R^{10}$ independently represent H or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing an H atom.

The term "carbocyclylalkyl", as used herein, refers to an alkyl group substituted with a carbocycle group.

The term "carbonate" is art-recognized and refers to a group —$OCO_2$—.

The term "carboxy", as used herein, refers to a group represented by the formula —$CO_2$H.

The term "cycloalkyl" includes substituted or unsubstituted non-aromatic single ring structures, preferably 4- to 8-membered rings, more preferably 4- to 6-membered rings. The term "cycloalkyl" also includes polycyclic ring systems having two or more cyclic rings in which two or more carbons are common to two adjoining rings wherein at least one of the rings is cycloalkyl and the substituent (e.g., $R^{100}$) is attached to the cycloalkyl ring, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, pyrimidine, denzodioxane, tetrahydroquinoline, and the like.

The term "ester", as used herein, refers to a group —C(O)$OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl—O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as "sed'erein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or H. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-H bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —$OSO_3H$, or a pharmaceutically acceptable salt thereof.

The term "sulfonamido" is art-recognized and refers to the group represented by the general formulae

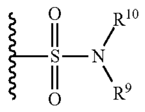

or

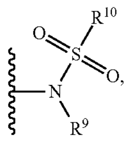

, wherein $R^9$ and $R^{10}$ independently represents H or hydrocarbyl.

The term "sulfoxide" is art-recognized and refers to the group—S(O)—.

The term "sulfonate" is art-recognized and refers to the group $SO_3H$, or a pharmaceutically acceptable salt thereof.

The term "sulfone" is art-recognized and refers to the group —$S(O)_2$—.

The term "substituted" refers to moieties having substituents replacing a H on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have H substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate. The term "thioalkyl", as used herein, refers to an alkyl group substituted with a thiol group.

The term "thioester", as used herein, refers to a group —C(O)S$R^9$ or —SC(O)$R^9$ wherein $R^9$ represents a hydrocarbyl.

The term "thioether", as used herein, is equivalent to an ether, wherein the oxygen is replaced with a sulfur.

The term "urea" is art-recognized and may be represented by the general formula

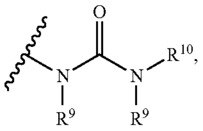

wherein $R^9$ and $R^{10}$ independently represent H or a hydrocarbyl.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

INCORPORATION BY REFERENCE

All US and PCT patent application publications and US patents mentioned herein are hereby incorporated by reference in their entirety as if each individual patent application publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

What is claimed is:

1. A method of synthesizing a poly (ester urea) (PEU) comprising:

a. providing an amino acid alkyl ester or amino acid alkyl ester hydrochloride;

b. reacting the amino acid with triphosgene in the presence of an amine base to produce an diester urea; and c. reacting the diester urea with a diol to produce the PEU.

2. The method of claim 1, wherein the amino acid alkyl ester or amino acid alkyl ester hydrochloride is an amino acid alkyl ester or amino acid alkyl ester hydrochloride of a naturally occurring amino acid.

3. The method of claim 1, wherein the method comprises providing an amino acid alkyl ester.

4. The method of claim 1, wherein the method comprises providing an amino acid alkyl ester hydrochloride.

5. The method of claim 1, wherein the amino acid alkyl ester or amino acid alkyl ester hydrochloride is a methyl ester, ethyl ester, or propyl ester.

6. The method of claim 1, wherein reacting the diester urea with the diol comprises heating the diester urea and the diol.

7. The method of claim 1, wherein reacting the diester urea with the diol comprises heating the diester urea and the diol under reduced pressure.

8. The method of claim 1, wherein the method is performed from 8-24 hours.

9. The method of claim 1, wherein the amine base is triethylamine or triethylammonium hydrochloride.

10. The method of claim 1, wherein the diol is an alkyl diol, an alkenyl diol, or an alkynyl diol.

11. The method of claim 1, wherein the diol is an alkyl diol.

12. The method of claim 1, wherein the diol is 1,6-hexanediol.

13. The method of claim 1, wherein the diester urea is selected from the group consisting of phenylalanine methyl ester urea, leucine methyl ester urea, and glycine ethyl ester urea.

14. The method of claim 1, wherein the method converts the amino acid alkyl ester or the amino acid alkyl ester hydrochloride to the PEU at a yield of greater than 90%.

15. The method of claim 1, wherein the method converts the amino acid alkyl ester or the amino acid alkyl ester hydrochloride to the PEU at a yield of greater than 95%.

16. The method of claim 1, wherein the method converts the amino acid alkyl ester or the amino acid alkyl ester hydrochloride to the PEU at a yield of greater than 99%.

17. The method of claim 1, wherein the stereochemistry of the amino acid alkyl ester or amino acid alkyl ester hydrochloride is retained in the PEU.

18. The method of claim 1, wherein the PEU has an average molecular weight of 500 to 1,500 Daltons.

19. The method of claim 1, wherein the PEU comprises, on average, 200-800 repeat units.

20. The method of claim 1, wherein the PEU comprises, on average, about 200, about 300, about 400, about 500, about 600, about 700, or about 800 repeat units.

21. The method of claim 2, wherein the diol is an alkyl diol.

22. The method of claim 2, wherein the diol is 1,6-hexanediol.

23. The method of claim 22, wherein the amino acid alkyl ester or amino acid alkyl ester hydrochloride is a methyl ester, ethyl ester, or propyl ester.

24. The method of claim 23, wherein the amine base is triethylamine or triethylammonium hydrochloride.

* * * * *